US011963594B2

(12) United States Patent
Floarea et al.

(10) Patent No.: US 11,963,594 B2
(45) Date of Patent: Apr. 23, 2024

(54) LOCKING SYSTEM FOR A CONTAINER

(71) Applicant: GM Global Technology Operations LLC, Detroit, MI (US)

(72) Inventors: George Floarea, Whitby (CA); David Akl, Kitchener (CA); Jonathan Wood, Marietta, GA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 17/392,546

(22) Filed: Aug. 3, 2021

(65) Prior Publication Data

US 2023/0045127 A1 Feb. 9, 2023

(51) Int. Cl.

*E05B 73/00* (2006.01)
*A45C 5/00* (2006.01)

(Continued)

(52) U.S. Cl.

CPC ................ *A45C 13/10* (2013.01); *A45C 5/00* (2013.01); *E05B 73/0005* (2013.01); *E05C 3/12* (2013.01); *E05B 73/00* (2013.01)

(58) Field of Classification Search

CPC ......... Y10T 292/1063; Y10T 292/1064; Y10T 292/1069; Y10T 292/107; Y10T 292/1071; Y10T 292/1072; Y10T 292/702; E05B 73/00; E05B 73/0005; E05B 2047/0075; E05B 15/0093; E05B 77/44; E05B 65/44; E05B 65/46; E05B 65/52; E05B 65/5284;

(Continued)

(56) References Cited

U.S. PATENT DOCUMENTS 1,177,495 A * 3/1916 Davis .................. E05B 15/0093 292/130
4,474,116 A * 10/1984 Castenada, Jr. ........ A45C 13/20 109/51

(Continued)

FOREIGN PATENT DOCUMENTS

GB 1154671 A * 6/1969
GB 2307227 A * 5/1997 ............. A45C 13/20

(Continued)

OTHER PUBLICATIONS

Translation of the ITRA20090037 reference.*

*Primary Examiner* — Carlos Lugo
(74) *Attorney, Agent, or Firm* — CANTOR COLBURN LLP

(57) ABSTRACT

A cabinet includes a locking system having a cabinet body including a bottom wall, a top wall, a first side wall, a second, opposing side wall, and a third side wall connected to the bottom wall, the top wall, and between the first side wall and the second side wall. At least one door is pivotally mounted to the cabinet body. The at least one door, bottom wall, top wall, first side wall, second side wall, and third side wall define a storage volume. A lock mechanism including a latch and release element is pivotally mounted inside the storage volume. The latch and release element is accessible only in the storage volume. A lock opening extends through the cabinet body at the lock mechanism. A lock element is insertable through the lock opening. The lock element includes a latch receiver that is selectively engageable by the latch and release element.

20 Claims, 3 Drawing Sheets

(51) Int. Cl.
*A45C 13/10* (2006.01)
*E05C 3/12* (2006.01)

(58) Field of Classification Search
CPC ...... E05B 65/5292; E05C 3/12; Y10S 292/68; A45C 13/10; A45C 13/1038; A45C 13/18; A45C 13/20
USPC ........................................ 70/77, 78, 101, 154
See application file for complete search history.

(56) References Cited

U.S. PATENT DOCUMENTS 5,094,487 A * 3/1992 Drewry ............... E05B 15/0093 292/135
5,406,809 A * 4/1995 Igelmund ............ E05B 73/0005 292/281
5,595,073 A * 1/1997 Sullivan ................ E05B 17/002 70/159
5,787,738 A * 8/1998 Brandt ................ E05B 73/0005 70/58
6,257,029 B1 * 7/2001 Liao .................... E05B 73/0005 70/57
7,079,032 B2 * 7/2006 Merrem ................ E05B 45/005 340/568.2
8,910,679 B2 * 12/2014 Avganim ............ E05B 73/0005 70/67
2004/0045329 A1 * 3/2004 Farnham ............ E05B 73/0005 70/161
2011/0116862 A1 * 5/2011 Lo ......................... G06F 1/1656 403/326

FOREIGN PATENT DOCUMENTS

IT RA20090037 * 9/2011
WO WO-2006095138 A1 * 9/2006 ............. A45C 13/20

* cited by examiner

LOCKING SYSTEM FOR A CONTAINER

INTRODUCTION

The subject disclosure relates to the art of containers and, more particularly, to a locking system for a container.

Many containers are left in public places unattended. For example, vendors at craft fairs, farmer's markets, street food, shoe care, and the like may leave containers unattended and exposed to the public. The containers themselves may be locked, but may not be secured in place. That is, the container may be removed from a place of rest and taken without permission. In order to prevent unauthorized removal of a container, many vendors use a lock and chain system.

Locks and chains can be bulky, require additional keys, and be generally cumbersome. Further, the locks are typically accessible outside of the container. Accordingly, it is desirable to provide a locking system that does not require a key and that is not accessible from outside of the container.

SUMMARY

Disclosed is a cabinet including a locking system having a cabinet body including a bottom wall, a top wall, a first side wall, a second, opposing side wall, and a third side wall connected to the bottom wall, the top wall, and between the first side wall and the opposing second side wall. At least one door is pivotally mounted to the cabinet body. The at least one door, bottom wall, top wall, first side wall, second side wall, and third side wall define a storage volume. A lock mechanism including a latch and release element is pivotally mounted to one of the bottom wall, top wall, first side wall, opposing second side wall, and third side wall inside the storage volume. The latch and release element is accessible only in the storage volume. A lock opening extends through the one of the bottom wall, top wall, first side wall, opposing second side wall, and third side wall at the lock mechanism. A lock element is selectively insertable through the opening into the storage volume. The lock element includes a latch receiver that is selectively engageable by the latch and release element.

In addition to one or more of the features described above or below, or as an alternative, further embodiments could include wherein the lock element includes a generally rectangular cross-section including a substantially planar surface defining an upper edge and a lower edge, a first side surface, and a second side surface, the latch receiver being defined in the upper edge.

In addition to one or more of the features described above or below, or as an alternative, further embodiments could include wherein the upper edge includes a first angled section and the lower edge includes a second angled section.

In addition to one or more of the features described above or below, or as an alternative, further embodiments could include wherein the lock element includes a cable opening extending through the first side surface and the opposing second side surface of the substantially planar surface.

In addition to one or more of the features described above or below, or as an alternative, further embodiments could include wherein the lock element includes an opening cover projecting outwardly of the upper edge, the lower edge, the first side surface, and the opposing second side surface between the opening and the latch receiver.

In addition to one or more of the features described above or below, or as an alternative, further embodiments could include wherein the lock element includes a substantially circular cross-section having first end, a second end, and a surface extending between the first end and the second end, the latch receiver being formed in the surface.

In addition to one or more of the features described above or below, or as an alternative, further embodiments could include wherein the latch receiver includes an outer surface and an annular recess formed in the outer surface.

In addition to one or more of the features described above or below, or as an alternative, further embodiments could include wherein the second end of the lock element includes a taper.

In addition to one or more of the features described above or below, or as an alternative, further embodiments could include wherein the lock element includes an opening cover projecting radially outwardly of the outer surface between the first end and the latch receiver.

In addition to one or more of the features described above or below, or as an alternative, further embodiments could include wherein the lock opening defines a slot formed in one of the first side wall, opposing second side wall, and the third side wall, the slot having an upper end and a lower end.

In addition to one or more of the features described above or below, or as an alternative, further embodiments could include a first guide element arranged adjacent the upper end of the slot and a second guide element arranged at the lower end of the slot.

In addition to one or more of the features described above or below, or as an alternative, further embodiments could include wherein the latch and release element is pivotally mounted to one of the first guide element and the second guide element.

In addition to one or more of the features described above or below, or as an alternative, further embodiments could include wherein the latch and release element includes a lock pin that is selectively received by the latch receiver.

In addition to one or more of the features described above or below, or as an alternative, further embodiments could include a lock pin guide arranged adjacent the opening, the first guide element and the second guide element, the lock pin including an opening that is receptive of the lock pin.

In addition to one or more of the features described above or below, or as an alternative, further embodiments could include wherein the latch and release element includes a first end pivotally mounted to the first guide element and a second, cantilevered end defining a release handle.

Also disclosed is a lock mechanism for a cabinet having an internal storage volume. The lock mechanism includes a latch and release element pivotally mounted to a wall of the cabinet inside the internal storage volume. The latch and release element is accessible only in the internal storage volume. A lock opening extends through the wall at the lock mechanism. A lock element is selectively insertable through the opening into the storage volume. The lock element includes a latch receiver that is selectively engageable by the latch and release element.

In addition to one or more of the features described above or below, or as an alternative, further embodiments could include wherein the lock element includes a generally rectangular cross-section including a substantially planar surface defining an upper edge and a lower edge, a first side surface, and a second side surface, the latch receiver being defined in the upper edge.

In addition to one or more of the features described above or below, or as an alternative, further embodiments could include wherein the upper edge includes a first angled section and the lower edge includes a second angled section.

In addition to one or more of the features described above or below, or as an alternative, further embodiments could include wherein the lock element includes a substantially circular cross-section having first end, a second end, and a surface extending between the first end and the second end, the latch receiver being formed in the surface.

In addition to one or more of the features described above or below, or as an alternative, further embodiments could include wherein the latch receiver includes an outer surface and an annular recess formed in the outer surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
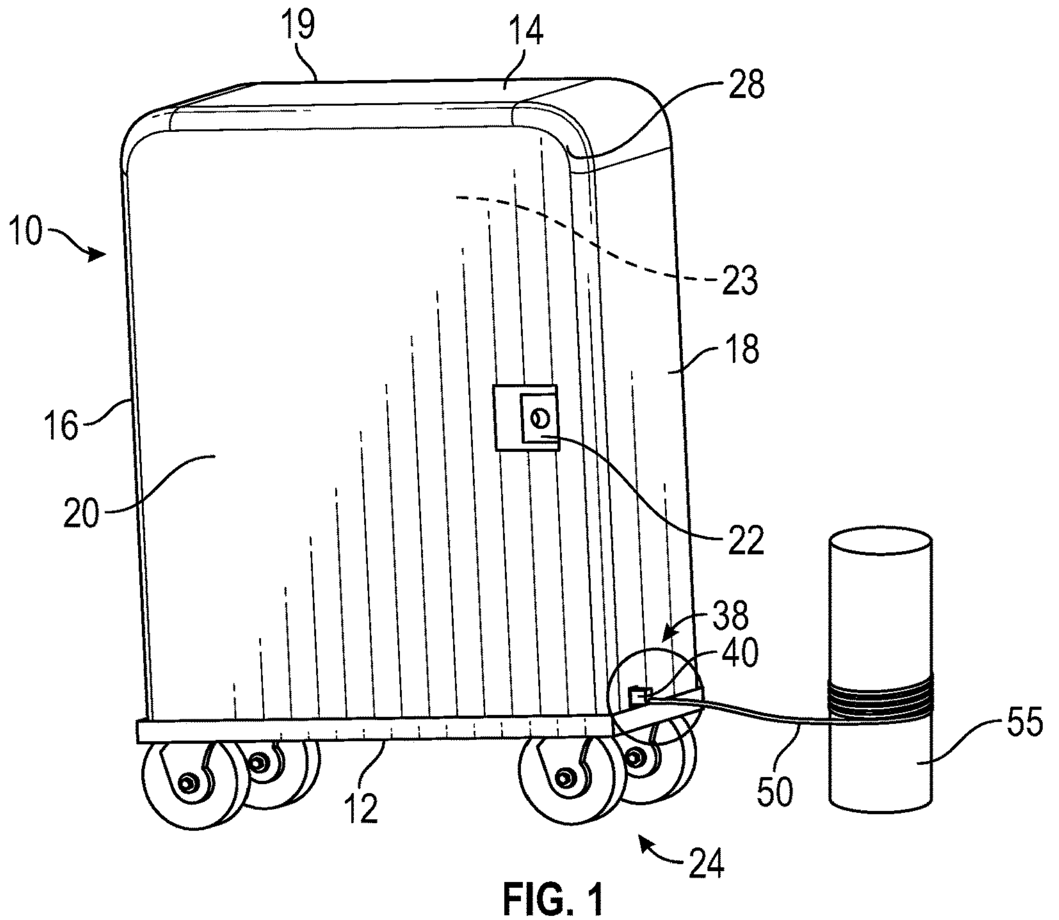
FIG. 1 depicts a container including a locking system, in accordance with a non-limiting example.

The following description is merely exemplary in nature and is not intended to limit the present disclosure, its application or uses. It should be understood that throughout the drawings, corresponding reference numerals indicate like or corresponding parts and features.

A cabinet, in accordance with a non-limiting example, is indicated at 10 in FIG. 1. Cabinet 10 includes a bottom wall 12, a top wall 14, a first side wall 16, a second or opposing side wall 18 and a third side wall 19. Third side wall 19 extends between and connects with first side wall 16 and second side wall 18. A door 20 including a latch 22 is pivotally mounted to cabinet 10. Together door 20, bottom wall 12, top wall 14, first side wall 16, second side wall 18, and third side wall 19 define a storage volume 23. A plurality of wheels indicated generally at 25 are mounted to bottom wall 12 so as to allow cabinet 10 to be mobile.

Figure 2:
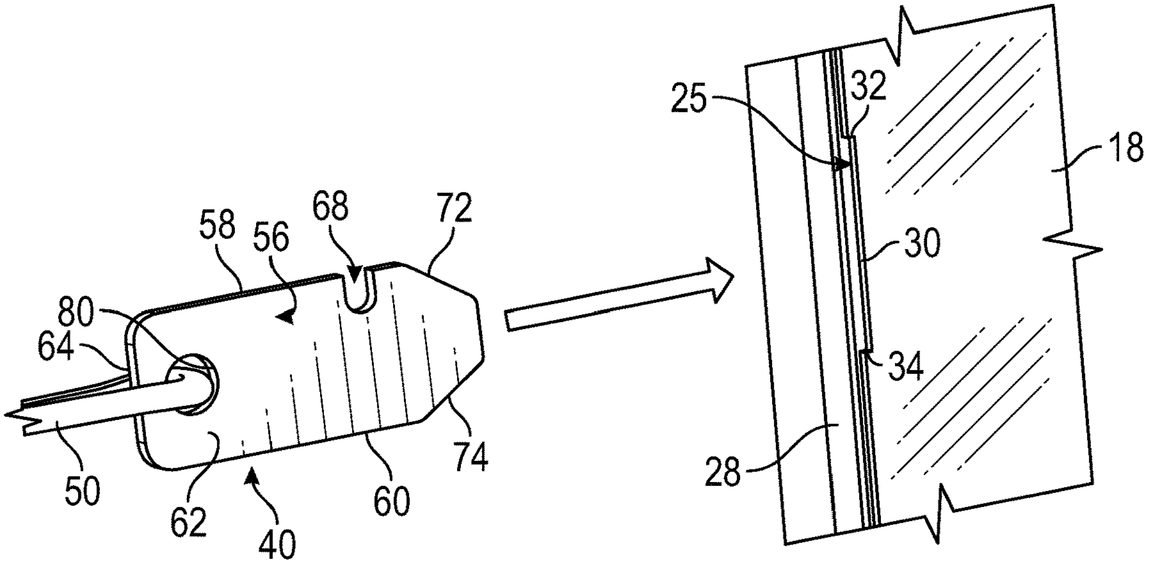
FIG. 2 depicts a lock element of the locking system of FIG. 1 being inserted into the container, in accordance with a non-limiting example.
Figure 3:
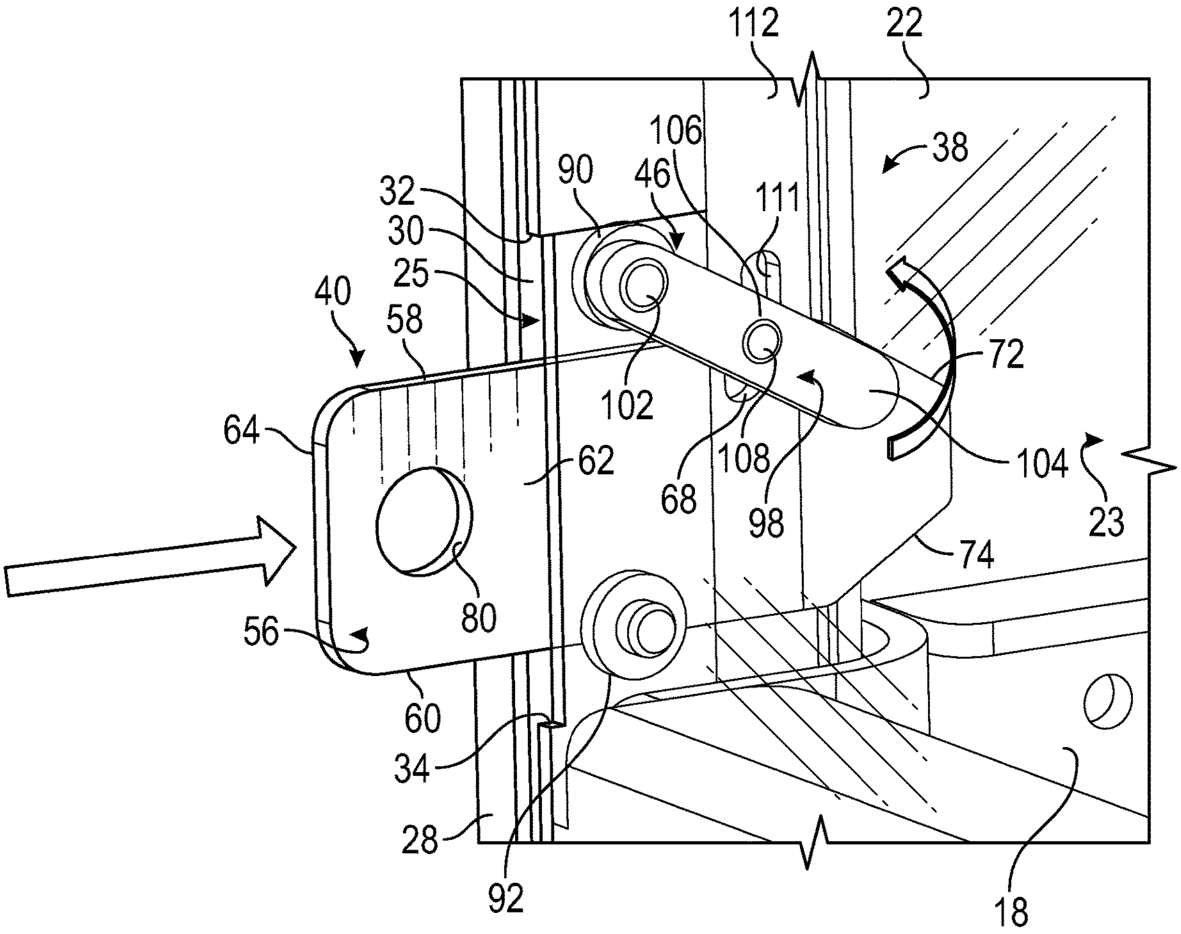
FIG. 3 depicts a lock mechanism of the locking system of FIG. 1, in accordance with a non-limiting example.

In accordance with a non-limiting example, cabinet 10 includes a lock opening 25 formed in second side wall 18 adjacent a door frame 28 as shown in FIG. 2. Lock opening 25 takes the form of a slot 30 having an upper end 32 and a lower end 34. While shown as a slot, it will become more fully evident herein that the geometry of lock opening 25 may vary. Cabinet 10 includes a locking system 38 including a lock element 40 and a lock mechanism 46 (FIG. 3). Locking system 38 allows a user to secure cabinet 10 with a cable 50 in a public space without the need for any additional keys. That is, lock mechanism 46 is only accessible from within storage volume 23. Thus, as long as the user can open door(s) 20, lock mechanism 46 can be accessed as will become more fully apparent herein.

As shown in FIG. 2, lock element 40 includes a generally rectangular cross-section having a substantially planar surface 56 defining an upper edge 58 and a lower edge 60. Substantially planar surface 56 defines a first side surface 62, while an opposing substantially planar surface (not separately labeled) defines a second, opposing side surface 64. Lock element 40 includes a latch receiver 68 that extends from upper edge 58 into first side surface 62 and second side surface 64 defining a notch (not separately labeled) the particular shape and dimensions of latch receiver 68 may vary. Upper edge 58 includes a first angled section 72 and lower edge 60 includes a second angled section 74. First angled section 72 and second angled section 74 facilitate insertion of lock element 40 into lock openings 25. Lock element 40 is further shown to include a cable opening 80 for connecting with cable 50.

Reference will now follow to FIG. 3 with continued reference to FIGS. 1 and 2 in describing lock mechanism 46 in accordance with a non-limiting example. Lock mechanism 46 includes a first guide element 90 arranged adjacent to upper end 32 of slot 30 and a second guide element 92 arranged adjacent to lower end 34 of slot 30. First guide element 90, and second guide element 92 together with first angled section 72 and second angled section 74 facilitate insertion of lock element 40 into slot 30. Lock mechanism 46 also includes a latch and release mechanism 98 that is mounted in storage volume 23 and selectively engages with lock element 40. Latch and release mechanism 98 includes a first end 102 which, in the non-limiting example shown, may be mounted to first guide element 90, a second, cantilevered end 104 defining a release handle (not separately labeled) and an intermediate portion 106. A lock pin 108 projects outwardly from intermediate portion 106 and may selectively rest in latch receiver 68. Lock pin 108 may extend through an opening 111 formed in a lock pin guide 112.

In a non-limiting example, cable 50 may include an end loop (not shown) and be passed around a post 55. Lock element 40 may be passed through the end loop and guided into slot 30. First end section 72 and/or second angled section 74 may interact with first guide element 90 and/or second guide element 92. As lock element 40 moves into slot 30, first angled section 72 acts on lock pin 108 to raise latch and release mechanism 98. With continued insertion, lock pin 108 will settle into latch receiver 68 effectively locking cabinet 10 to the post. Locking may occur with or without access to storage volume 23. To release, a user must access storage volume 23 and engage with latch and release mechanism 98 to raise lock pin 108 out from latch receiver 68. At this point, lock element 40 may be withdrawn from slot 30.

Figure 4:
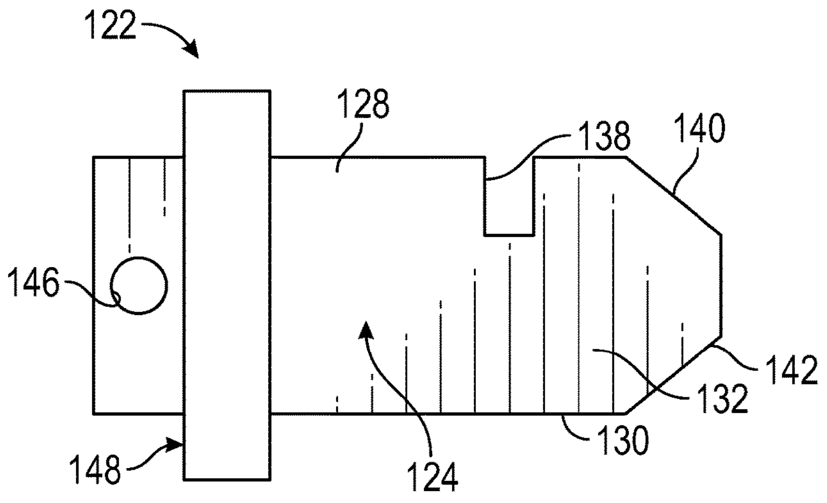
FIG. 4 is side view of a lock element, in accordance with another non-limiting example.
Figure 5:
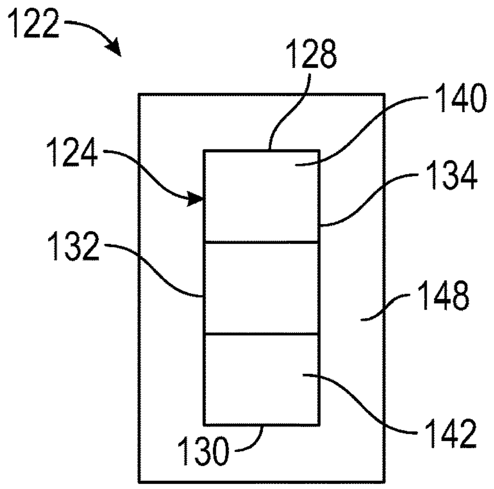
FIG. 5 is an end view of the lock element of FIG. 4, in accordance with a non-limiting example.

Reference will now follow to FIGS. 4 and 5, with continued reference to FIGS. 1 and 3 in describing a lock element 122 in accordance with another non-limiting example. Lock element 122 includes a generally rectangular cross-section having a substantially planar surface 124 defining an upper edge 128, and a lower edge 130. Substantially planar surface 124 defines a first side surface 132 while an opposing second substantially planar surface (not separately labeled) defines a second, opposing side surface 134. A latch receiver 138 extends from upper edge 128 into first side surface 132 and second side surface 134. Upper edge 128 includes a first angled section 140 and lower edge 130 includes a second angled section 142. A cable opening 146 extends through lock element 122.

In accordance with a non-limiting example, lock element 122 includes a lock opening cover or shield 148. Lock opening cover 148 projects outwardly of upper edge 128, lower edge 130, first side surface 132, and second side surface 134 as shown in FIG. 5. Lock opening cover 148 prevents unwanted access of lock opening 25 when lock element 122 is installed. In this manner, lock element 122 provides an added level of tamper-proof securing for locking system 38.

Figure 6:
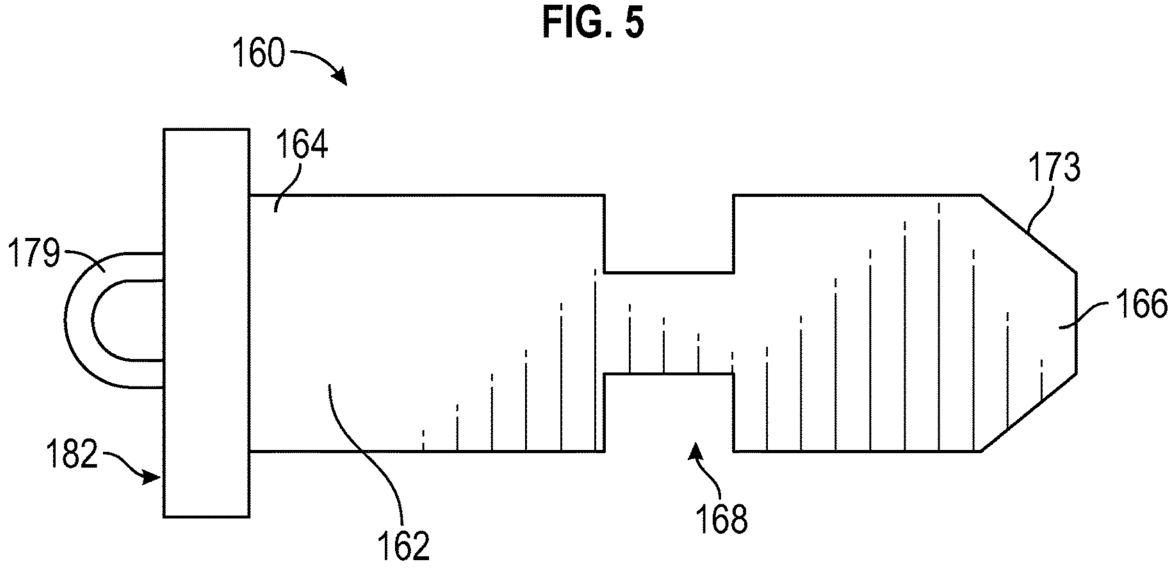
FIG. 6 is a side view of a lock element, in accordance with yet another non-limiting example.
Figure 7:
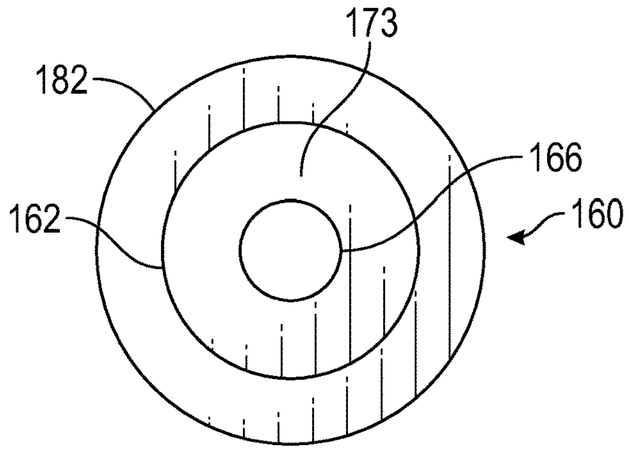
FIG. 7 is an axial end view of the lock element of FIG. 6, in accordance with a non-limiting example.

FIGS. 6 and 7 depicts a lock element 160 in accordance with another non-limiting example. Lock element 160 includes a substantially circular cross-section having an outer surface 162 that extends between a first end 164 and a second end 166. A latch receiver 168 is defined in outer surface 162. Latch receiver 168 may take the form of an annular recess 170. Second end 166 may include a taper 173 that facilitates insertion into a corresponding lock opening (not shown). First end 164 includes a cable support 179 that may connect with cable 50. A lock opening cover 182 projects radially outwardly of outer surface 162 between latch receiver 168 and cable support 179. Lock opening cover 182, in a manner similar to that described herein, prevents unwanted access of the lock opening when lock element 160 is installed.

At this point, it should be understood that the locking system is not limited to the examples shown. That is, in addition to a latch dropping under force of gravity to place a lock pin in a latch pin receiver, springs may be used to urge a latch upwardly or to one side or another. Further, the particular geometry of the lock opening and the lock elements may vary as well as the location of both the lock and lock opening may vary. The non-limiting examples shown present a system for locking a cabinet or other structure without the need for additional keys or to memorize combinations. The latch is only accessible once the cabinet doors are unlocked and open.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A cabinet comprising:

a cabinet body including a bottom wall, a top wall, a first side wall, a second, opposing side wall, and a third side wall connected to the bottom wall, the top wall, and between the first side wall and the opposing second side wall;

at least one door pivotally mounted to the cabinet body, the at least one door, bottom wall, top wall, first side wall, opposing second side wall, and third side wall defining a storage volume;

a lock mechanism including a latch and release element pivotally mounted to one of the bottom wall, top wall, first side wall, opposing second side wall, and third side wall inside the storage volume, the latch and release element being accessible only in the storage volume;

a lock opening extending through the one of the bottom wall, top wall, first side wall, opposing second side wall, and third side wall at the lock mechanism; and a lock element selectively insertable through the lock opening into the storage volume, the lock element including a latch receiver that is selectively engageable by the latch and release element, the lock element being configured to be connected to a structure to prevent unauthorized removal of the cabinet, wherein the lock opening defines a slot formed in one of the first side wall, second side wall, and the third side wall, the slot having an upper end and a lower end, a first guide element is arranged adjacent the upper end of the slot and a second guide element is arranged at the lower end of the slot, and wherein the latch and release element is pivotally mounted to one of the first guide element and the second guide element.

2. The cabinet according to claim 1, wherein the lock element includes a generally rectangular cross-section including a substantially planar surface defining an upper edge and a lower edge, a first side surface, and a second side surface, the latch receiver being defined in the upper edge.

3. The cabinet according to claim 2, wherein the upper edge includes a first angled section and the lower edge includes a second angled section.

4. The cabinet according to claim 2, wherein the lock element includes a cable opening extending through the first side surface and the second side surface of the substantially planar surface the cable opening being receptive of a cable that extends about the structure.

5. The cabinet according to claim 4, wherein the lock element includes an opening cover projecting outwardly of the upper edge, the lower edge, the first side surface, and the second side surface between the opening and the latch receiver.

6. The cabinet according to claim 1, wherein the lock element includes a substantially circular cross-section having first end, a second end, and a surface extending between the first end and the second end, the latch receiver being formed in the surface.

7. The cabinet according to claim 6, wherein the latch receiver includes an outer surface and an annular recess formed in the outer surface.

8. The cabinet according to claim 7, wherein the second end of the lock element includes a taper.

9. The cabinet according to claim 8, wherein the lock element includes an opening cover projecting radially outwardly of the outer surface between the first end and the latch receiver.

10. The cabinet according to claim 1, wherein the latch and release element includes a lock pin that is selectively received by the latch receiver.

11. The cabinet according to claim 10, further comprising: a lock pin guide arranged adjacent the opening, the first guide element and the second guide element, the lock pin including an opening that is receptive of the lock pin.

12. The cabinet according to claim 1, wherein the latch and release element includes a first end pivotally mounted to the first guide element and a second, cantilevered end defining a release handle.

13. A cabinet including a plurality of walls defining an internal storage volume, at least one of the plurality of walls including a lock opening, the comprising:

a lock mechanism comprising a latch and release element pivotally mounted to a wall of the cabinet inside the internal storage volume, the latch and release element being accessible only in the internal storage volume;

a lock opening extending through the wall at the lock mechanism; and a lock element selectively insertable through the opening into the internal storage volume, the lock element including a latch receiver that is selectively engageable by the latch and release element, the lock element being configured to connected to a structure to prevent unauthorized removal of the cabinet, wherein the lock opening defines a slot formed in one of the first side wall, second side wall, and the third side wall, the slot having an upper end and a lower end, a first guide element is arranged adjacent the upper end of the slot and a second guide element is arranged at the lower end of the slot, and wherein the latch and release element is pivotally mounted to one of the first guide element and the second guide element.

14. The cabinet according to claim 13, wherein the lock element includes a generally rectangular cross-section including a substantially planar surface defining an upper edge and a lower edge, a first side surface, and a second side surface, the latch receiver being defined in the upper edge.

15. The cabinet according to claim 14, wherein the upper edge includes a first angled section and the lower edge includes a second angled section.

16. The cabinet according to claim 13, wherein the lock element includes a substantially circular cross-section having first end, a second end, and a surface extending between the first end and the second end, the latch receiver being formed in the surface.

17. The cabinet according to claim 16, wherein the latch receiver includes an outer surface and an annular recess formed in the outer surface.

18. The cabinet according to claim 14, wherein the lock element includes a cable opening extending through the substantially planar surface.

19. The cabinet according to claim 14, wherein the latch receiver comprises a rectangular notch formed in the upper edge.

20. The cabinet according to claim 16, wherein the lock element includes a cable support provided at the first end.

* * * * *